US007869783B2

(12) United States Patent
Morton et al.

(10) Patent No.: US 7,869,783 B2
(45) Date of Patent: Jan. 11, 2011

(54) EXTENDED SMART ANTENNA SYSTEM

(75) Inventors: Christopher Morton, Longwood, FL (US); Frank M. Caimi, Vero Beach, FL (US)

(73) Assignee: Sky Cross, Inc., Viera, FL (US)

( * ) Notice: Subject to any disclaimer, the term of this patent is extended or adjusted under 35 U.S.C. 154(b) by 957 days.

(21) Appl. No.: 11/678,964

(22) Filed: Feb. 26, 2007

(65) Prior Publication Data

US 2007/0224949 A1 Sep. 27, 2007

Related U.S. Application Data

(60) Provisional application No. 60/776,607, filed on Feb. 24, 2006.

(51) Int. Cl.
*H04B 1/06* (2006.01)

(52) U.S. Cl. .................................... 455/272; 455/277.1

(58) Field of Classification Search ................. 455/561, 455/562.1, 575.1, 101, 272, 276.1, 277.1, 455/277.2, 278.1; 375/267, 347
See application file for complete search history.

(56) References Cited

U.S. PATENT DOCUMENTS

| | | | | |
|---|---|---|---|---|
| 5,907,816 | A * | 5/1999 | Newman et al. | 455/562.1 |
| 6,404,391 | B1 | 6/2002 | Apostolos | |
| 6,535,175 | B2 | 3/2003 | Brady et al. | |
| 6,574,460 | B1 * | 6/2003 | Lindenmeier et al. | 455/277.1 |
| 6,650,295 | B2 | 11/2003 | Ollikainen | |
| 6,693,594 | B2 | 2/2004 | Pankinaho | |
| 6,759,991 | B2 | 7/2004 | Boyle | |
| 7,272,372 | B2 * | 9/2007 | Kasami et al. | 455/277.2 |
| 2003/0092402 | A1 * | 5/2003 | Shapira et al. | 455/101 |
| 2005/0130597 | A1 | 6/2005 | Li et al. | |
| 2005/0266902 | A1 * | 12/2005 | Khatri et al. | 455/101 |

OTHER PUBLICATIONS

Dietrich, Stutzman, Kim, Dietze; Smart Antennas in Wireless Communications: Base-Station Diversity and Handset Beamforming; IEEE Antennas and Propagation Magazine; Oct. 2000; pp. 142-151; vol. 42, No. 5; IEEE; USA.

* cited by examiner

*Primary Examiner*—Thanh C Le
(74) *Attorney, Agent, or Firm*—John L. DeAngelis; Beusse Wolter Sanks Mora & Maire, P.A.

(57) ABSTRACT

A communications device for receiving a propagating electromagnetic signal representing an information signal. The communications device comprises a first and a second radiator each comprising a plurality of structural elements; a controller for configuring one or more of the structural elements of the first radiator to produce first operating characteristics of the first radiator, the first radiator producing a first received signal responsive to the first operating characteristics; the controller for configuring one or more of the structural elements of the second radiator to produce second operating characteristics of the second radiator different than the first operating characteristics, the second radiator producing a second received signal responsive to the second operating characteristics and a signal processor responsive to at least one of the first and the second received signals for determining the information signal.

23 Claims, 6 Drawing Sheets

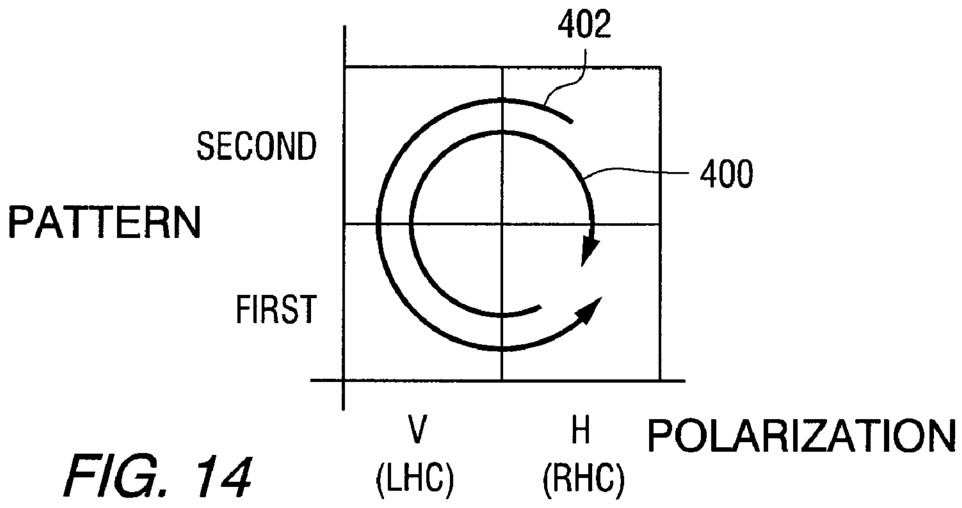
FIG. 14
| | EPOCH 1 | EPOCH 2 | EPOCH 3 |
|---|---|---|---|
| RADIATOR N-1 | (LHC) FIRST | (LHC) SECOND | ETC. → |
| RADIATOR N | (RHC) FIRST | (RHC) FIRST | |
| RADIATOR N+1 | (LHC) FIRST | (LHC) FIRST | |
FIG. 15
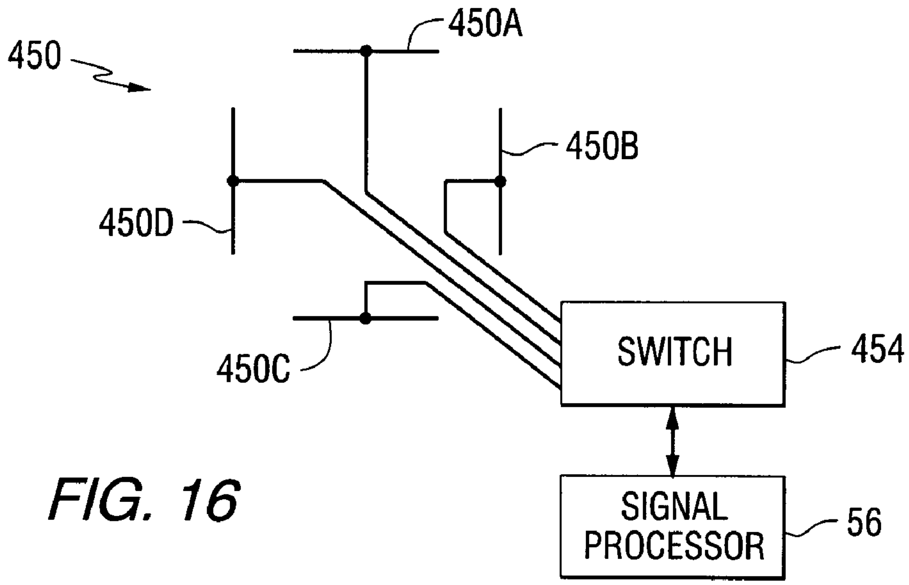
FIG. 16

EXTENDED SMART ANTENNA SYSTEM

The present application claims the benefit of under Section 119(e) of the provisional patent application filed on Feb. 24, 2006 and assigned application No. 60/776,607.

FIELD OF THE INVENTIONS

The present invention relates generally to antenna systems for communications devices, and specifically to antenna systems comprising controllable elements for improving operation of the communications device.

BACKGROUND OF THE INVENTIONS

FIG. 1 is a block diagram illustrating a communications network 10 comprising a communications device 15 for transmitting radio frequency signals to and receiving radio frequency signals from a transceiver 20 over a communications channel 21. One or more characteristics of the radio frequency signals are modulated by a modulating information signal to convey information from the transmitting site to the receiving site. In exemplary systems an analog or a digital signal representing data, video, voice, audio, multimedia and other types of information, and any combination thereof, modulates a frequency, amplitude or phase of the radio frequency signal to convey the information.

The communications device 15 includes an arbitrary number of antenna elements 22 (radiators) excited by the received radio frequency signal for producing a received signal that is supplied to signal processing components (not separately illustrated) of the communications device 15 to determine the information signal. When operating in a transmitting mode, the information signal is generated and processed by signal processing components and supplied to the radiators 22 for transmission to the transceiver 20.

It is desired to reproduce the information signal at the receiving site (either the transceiver 20 or the communications device 15) as an exact replica of the information signal generated at the transmitting site. Time-varying noise components, time-varying communications channel aberrations and movement of the communications device 15 relative to the transceiver 20 impair the ability of the receiving station to reproduce the information signal, possibly resulting in the loss of information or errors in the reconstruction of the transmitted information signal.

Various techniques are known to increase the probability that the information signal is accurately reproduced at the receiving station. Certain of these techniques rely on characteristics of the communications protocol and others involve optimal selection and design of the signal processing components and the antenna elements 22. For example, spatially diverse, polarization diverse antennas can be used at the transmitting and/or the receiving station. A signal quality metric is determined for the received signal produced at each of the antenna elements 22. The signal having the best signal quality metric is selected for processing by the signal processor 40.

FIG. 2 illustrates components of the prior art communications device (transceiver) 15, comprising a plurality of fixed (i.e. structurally unchangeable) radiators 1 to N (referred to by reference character 22 in FIG. 1) operative with a signal processor 40 when selected according to a configuration of a switch 44. The signal processor 40 represents the components in the transmitted signal path that supply a modulated radio frequency (RF) signal to one or more of the radiators 1 to N for transmission to a receiving station and the components in the received signal path that process the RF signal received by one or more of the radiators 1 to N to reproduce the information signal. The signal processing techniques employed within the signal processor 40 are selectably optimized to improve a signal processing gain of the processor 40 and increase the probability of accurate information signal detection. Such processing gain techniques are well known in the art.

According to the prior art, each radiator 1 to N in the communications device 15 comprises a single feed antenna having fixed structural elements providing fixed performance characteristics, such as, radiation pattern, polarization, bandwidth, efficiency (gain), size, impedance and dual or multi-band resonance. The signal processor 40 can process one received signal from a single selected radiator 1 to N or a combination of received signals from a plurality of the radiators 1 to N.

To further maximize the probability of accurate information signal detection, the intended application of the communications device 15 dictates the type and number of antennas installed therein. It is known that in certain applications, including especially handset communications devices, the number of antennas required may exceed the space available in the communications device. Further, as handset designers continue to shrink their products for the user's convenience, the space available for radiating structures is commensurately reduced.

Since the structural elements of each radiator 1 to N are fixed, the received signal produced by each radiator is determined by these structural elements and their excitation by the propagating RF signal, which is in turn dependent on the protocol of the propagating signal and the characteristics of the communications channel 21, including the orientation of the structural elements relative to the propagating signal. For instance, time varying and time invariant channel characteristics can create multi-path effects, adjacent channel interference and additive noise in the signal received at one or more of the radiators 1 to N. These channel characteristics affect the signal produced by each radiator 1 to N differently according to the characteristics of the radiator, producing different received signals at the signal processor 40 from each radiator 1 to N. Also, each signal protocol or signal structure (modulation schemes, multiple access technique, etc. e.g., CDMA, GSM, W-CDMA, EDGE) is affected differently by the channel characteristics and therefore produces a different received signal at each radiator.

To improve detection of the information signal at the receiving station, prior art "smart" or signal processing assisted antenna systems, such as multiple input/multiple output (MIMO) systems, combine the received signal produced by each antenna element of the antenna array. The combining process comprises simple summing, weighted summing (including amplitude and/or phase weights) and statistical combinations, with the intent to generate a received signal that provides the best signal enhancement or noise reduction.

Certain smart antenna systems require a total of several (e.g., three to five or more) antenna radiators at the receive (and the transmitter) to achieve a useful processing gain for the antenna system. The processing gain tends to increase directly as the number of radiators increases. This general functional relationship is depicted in FIG. 3, where each additional radiator yields an increase (in this example a step-wise increase) in processing gain and/or data rate (capacity).

A fixed beam smart antenna array operates with a signal processor that controls the antenna array elements to produce different radiation beam patterns and selects the pattern providing the greatest signal enhancement or interference reduction. The signals produced at each array element are combined to produce the received signal. An adaptive array smart antenna can dynamically change the antenna pattern to adjust to time variant channel characteristics such as noise, interference and multipath fading.

BRIEF DESCRIPTION OF THE INVENTIONS

In one embodiment, the present invention comprises a communications device for receiving a propagating electromagnetic signal representing an information signal. The communications device comprises a first and a second radiator each comprising a plurality of structural elements; a controller for configuring one or more of the structural elements of the first radiator to produce first operating characteristics of the first radiator, the first radiator producing a first received signal responsive to the first operating characteristics; the controller for configuring one or more of the structural elements of the second radiator to produce second operating characteristics of the second radiator different than the first operating characteristics, the second radiator producing a second received signal responsive to the second operating characteristics and a signal processor responsive to at least one of the first and the second received signals for determining the information signal.

In another embodiment the present invention comprises an antenna for receiving a propagating electromagnetic signal representing an information signal, the antenna operative with an antenna controller and a signal processor. The antenna comprises a plurality of radiators, wherein each radiator comprises a plurality of structural elements, each radiator further comprising a resonant element responsive to the electromagnetic signal for producing a received signal; the antenna controller for configuring one or more of the structural elements of a first radiator to produce a first received signal at a first resonant element and for configuring one or more of the structural elements of a second radiator to produce a second received signal at a second resonant element, the second received signal different from the first received signal and the signal processor for processing at least one of the first and the second received signals to determine the information signal.

BRIEF DESCRIPTION OF THE DRAWINGS

The present invention can be more easily understood and the advantages and uses thereof more readily apparent when the following detailed description of the present invention is read in conjunction with the figures wherein:

FIGS. 14 and 15 illustrate control strategies for communications device radiators according to the present invention.

FIG. 16 illustrates an exemplary extended smart antenna system according to the teachings of the present invention.

In accordance with common practice, the various described features are not drawn to scale, but are drawn to emphasize specific features relevant to the invention. Like reference characters denote like elements throughout the figures and text.

DETAILED DESCRIPTION OF THE INVENTIONS

Figure 1:
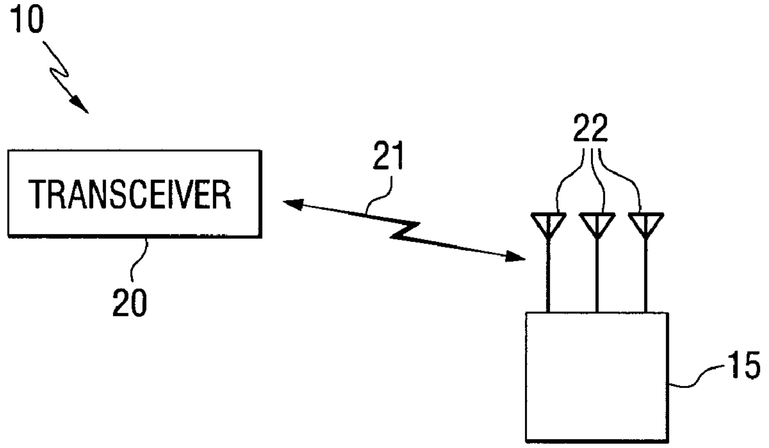
FIG. 1 PRIOR ART
FIGS. 1 and 2 illustrate prior art communications devices.
Figure 2:
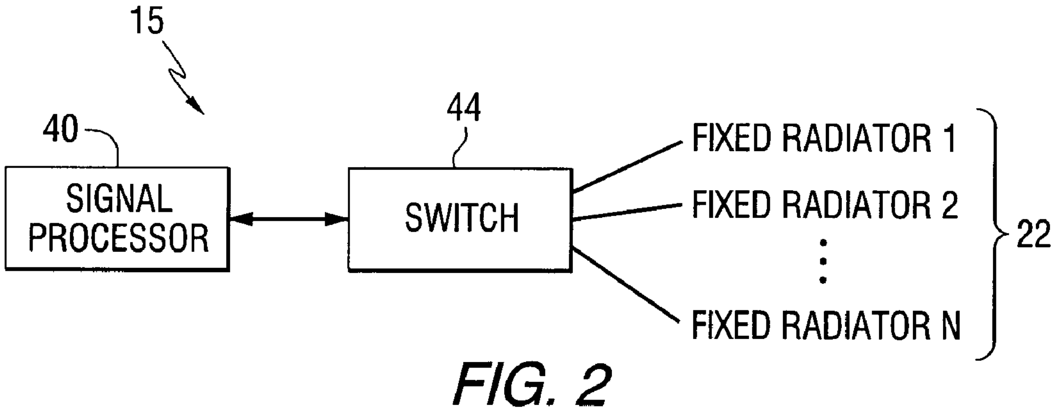
FIG. 2 PRIOR ART
Figure 3:
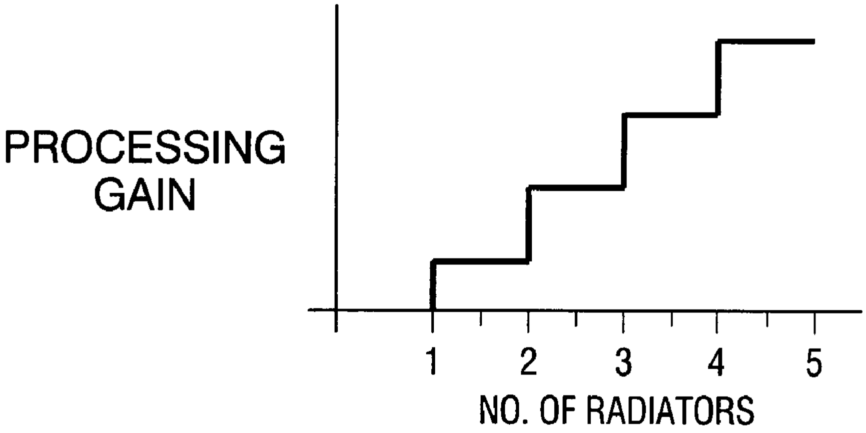
FIG. 3 PRIOR ART
FIG. 3 illustrates a graph of processing gain as a function of the number of radiators according to prior art communications devices.

Before describing exemplary methods and apparatuses related to an extended smart antenna system according to the present invention, it should be observed that the present invention resides primarily in a novel and non-obvious combination of elements and process steps. So as not to obscure the disclosure with details that will be readily apparent to those skilled in the art, certain conventional elements and steps have been presented with lesser detail, while the drawings and the specification describe in greater detail other elements and steps pertinent to understanding the invention.

The following exemplary embodiments are not intended to define limits as to the structure or method of the invention, but only to provide exemplary constructions. The embodiments are permissive rather than mandatory and illustrative rather than exhaustive As is known by those skilled in the art, processing gain or figure of merit of an antenna system can be defined according to several definitions, including, for example, aggregate data throughput, channel capacity and/or aggregate gain. Other definitions are known in the art. The teachings and applications of the present invention are not limited to a specific definition of the figure of merit or the processing gain.

As described above, prior art radiators (a single antenna or an antenna array comprising antenna elements) of a communications device comprise different, but fixed, structural elements. The different structural elements allow each radiator to produce a different received signal from the other radiators, where the differences are due solely to the different structural features and to the effect of the signal and channel characteristics on these fixed structural features. The degree of similarity and dissimilarity of the received signals (referred to as the "signal distance") is thus limited by the fixed radiator characteristics, predetermined signal characteristics and unpredictably changing channel characteristics. The signal processing gain attributable to the antenna system is thus commensurately limited. For example, a beam forming antenna constructively combines signals provided to antenna elements in the transmitting mode (or supplied from the antenna elements in the receiving mode) to create an antenna with increased gain in one or more directions. Similarly, null steering destructively combines signals from the antenna elements to produce a null in one more spatial directions.

According to the teachings of the present invention, it is desired to controllably increase the signal distance of the received signals, increasing the antenna system signal processing gain and thereby improve the probability of accurately detecting the information signal. As described in detail below, the antenna system processing gain is increased according to the present invention by selectively and intelligently controlling structural elements of one or more antennas responsive to operating conditions of the communications device. Several control regimens are described as within the scope of the invention, including closed loop control systems that sense a performance parameter and correspondingly control an antenna structural element to beneficially change the antenna parameter.

In one embodiment the structural elements of one or more antennas ate controlled to present physical attributes (e.g., length, feed point) and geometrical configurations (e.g., orientation of each operative element relative to the other elements) responsive to determined operating conditions. The structural elements can also be controlled to present physical attributes and/or geometrical configurations that vary according to a specific pattern as a function of time. In another embodiment the antenna's structural elements are adaptively controlled to present attributes and configurations that vary in real time according to time-varying operating conditions. The elements of one or more antennas are controlled to increase the signal distance between the received signal produced by any two of the elements.

The signal distance concept referred to herein is a measure of the independence or correlation of the received signals produced by the antennas of the communications device. The present invention thus teaches increasing the independence or reducing the correlation of the received signals (decorrelating) to increase the antenna system processing gain. It may also be desired to increase the number of degrees of freedom (the number of antenna elements) and/or the spacing between antenna elements to improve the antenna processing gain.

In one embodiment, the present invention teaches a communications device 46 (see FIG. 4) comprising an extended smart antenna system 48 further comprising a plurality of radiators 1 to N, where the radiators 1 to N represent any type of radiator or antenna structure or an antenna array, and not necessarily the same type of radiator or antenna structure. Each radiator 1 to N comprises one or more controllable elements responsive to control signals supplied on a conductor 52 (shown in phantom) from a signal processor 56. RF signals to be transmitted from the radiators 1 to N and received signals supplied by the radiator 1 to N are carried over conductors 58 between the signal processor 56 and the radiators 1 to N. The radiators 1 to N can be configured in any desired geometrical shape, including a linear, rectangular, triangular or spiral shape.

The control signal supplied to each radiator 1 to N controls radiator structures (e.g., feed point) to modify radiator physical attributes and/or geometrical configurations that in turn modify the radiator's performance characteristics such as, resonant frequency, radiation pattern, signal polarization, antenna impedance, antenna gain, radiation intensity, pattern directivity, bandwidth and antenna efficiency With different operating characteristics, each radiator extracts different information from the propagating signal and each therefore produces a different received signal. Control of the radiators seeks to take advantage of the differences among the received signals, and to increase the signal distance between the received signals, thereby increasing the processing gain of the antenna system. With an increased antenna system processing gain, when combined with the signal processor gain, the signal gain of the communications device is increased over the gain attainable according to the prior art devices.

In one embodiment, all N received signals from the radiators 1 to N are processed within the signal processor 56, and due to the greater signal distance between the received signals, the probability of accurate reproduction of the information signal increases.

In other embodiments, certain ones (or only one) of the radiators 1 to N are selected, that is, the received signals from only the selected radiators are processed in the signal processor 56. The excluded received signals may be extraneous and are therefore not processed.

In either case where all or selected received signals are processed, the signals can be independently processed within the signal processor 56 or the signals can be combined prior to processing, such as a combination of a simple sum, weighted sum (where certain received signals are assigned amplitude and phase weights), averaging, etc.

The control signals are produced by a controller (not separately illustrated) within the signal processor 56, a priori responsive to long term fixed operating conditions or adaptively responsive to changing operating conditions of the communications device 46.

A signal characteristic or an operating environment characteristic that is expected to remain fixed for an extended time, e.g., the signal protocol or the signal modulation scheme, can be determined and responsive control signals supplied to one or more of the radiators 1 to N to control the radiators in a manner known to improve the signal distance for the operative protocol. The radiators 1 to N remain in this fixed state as long as the protocol or modulation scheme is extant. In one embodiment the radiators' physical attributes and geometrical configurations are predetermined according to the modulation scheme (e.g., AM, FM, FSK) or multiple access scheme (e.g., CDMA, W-CDMA, EDGE, GSM) of the propagating signal. In another exemplary embodiment the radiator structures are controlled to modify the signal polarization characteristics of one or more radiators 1 to N responsive to the polarization characteristics of the propagating signal. In yet another embodiment, the radiators 1 to N are controlled to provide a desired radiation pattern to maximize the signal received from (or transmitted to) another communications device (or to minimize interference associated with the received or transmitted signal).

For example, when the communications device operates in a CDMA mode, each radiator 1 to N is configured according to a predetermined configuration that increases the antenna system processing gain for CDMA signals. In response to the determined CDMA mode, the controller within the signal processor 56 supplies control signals to the structural elements of one or more of the radiators 1 to N to achieve the desired radiator configuration. When the communications device switches to AMPS mode, for example, the control signals configure one or more of the radiators 1 to N to present different characteristics that improve the signal processing gain for AMPS operation. By determining the operating mode of the communications device and accordingly configuring the radiators 1 to N, the processing gain can be increased for any and all operating modes.

In another embodiment in response to a determined current operating mode, the control signals control the radiators 1 to N to present a predetermined pattern of antenna characteristics as a function of time. For example, the signal polarization and/or the radiation pattern of the radiators 1 to N are modified with time according to a predetermined scheme.

In yet another embodiment, certain ones of the radiators 1 to N are optimized for supplying appropriately distanced received signals during certain predetermined operating conditions, and others of the radiators 1 to N are optimized for supplying appropriately distanced received signals during other operating conditions. The received signals are selected for processing responsive to a current operating condition. The number of radiators N is determined to accommodate all expected operating conditions.

Adaptive control of the radiators 1 to N according to another embodiment of the present invention responds to time varying operating characteristics, e.g., signal fading or movement of the communications device 46 relative to the transmitting/receiving station with which it is communicating. Such operating characteristics are determined in real time, for example, by measuring one or more signal quality metrics, generating suitable control signals based on the measured metrics and supplying the control signals to the radiators 1 to N to effectuate the desired control of the radiator's physical attributes and geometrical configurations of the radiators to enhance the received signal or limit the received interference and noise.

By controlling each radiator's physical attributes and geometrical configurations, and thus each radiator's operational characteristics, and independently processing or combining the resulting signals produced by each radiator, the extended smart antenna system 48 of the present invention provides a greater processing gain than known in the prior art. In one embodiment the extended smart antenna system 48 offers a gain similar to the gain of the prior art smart antenna systems, but uses fewer radiators than the prior art systems. Alternatively, the processing gain can be increased to a value greater than the gain available in the prior art communications devices by increasing the number of radiators or the number of radiators can be reduced below the number present in prior art communications devices while the processing gain remains substantially unchanged. Design trade-offs between processing gain and the number of radiators can be made to optimize performance, limited by the number of radiators that can be accommodated in the space allocated to antennas.

Any radiator type (e.g., monopole, dipole, loop, patch, spiral, inverted-F, PIFA, helical, switchable meanderline (i.e., slow wave) loaded antenna, microstrip antenna, printed antenna), alterable physical attributes for each radiator, various combinations of the radiators and their relative configurations and techniques for altering the radiators can be employed in the extended smart antenna system 48 of the present invention. For example, in one embodiment each radiator comprises a plurality of switching elements, each switching element controllable to a closed condition to connect a signal feed to a unique region on the radiator structure. In another embodiment switching elements provide a selectively controllable ground point for the radiator. In either embodiment, the operational characteristics of the radiator are modified by opening and closing selective switching elements responsive to the control signals. Controlling the switchable radiators to increase the signal distance increases the signal processing gain of the communications device.

The communications device 46 constructed according to the teachings of the present invention and a communications device with which it communicates may be elements of one or more networks, including, but not limited to, a public switched telephone network, the Internet, a public or private network, a wired or wireless network, a local, wide, metropolitan, regional, a global communications network, an enterprise intranet, a cellular telephone network, a mesh network, a point-to-point network or any other network or any combination thereof.

The communications device 46 comprises, for example, a notebook/laptop computer, a desktop computer, a personal digital assistant, a cellular telephone, a communications handset, any portable or mobile communications device or any other device suitable for communicating RF signals to another communications device or a plurality of such communications devices and receiving signals therefrom.

The communications device 46 and the network with which it is associated can operate according to any communications protocol and network service, including but not limited to, internet protocol (IP), mobile IP, any of the code division multiple access (CDMA) protocols (including wideband CDMA), personal communications service (PCS), advanced mobile phone service (AMPS), time division multiple access (TDMA) service, frequency division multiple access (FDMA) service, ultra wideband service, global system for mobile communications (GSM) service, IEEE 802.11x services (WI FI services), cellular technology protocols, wireless network services, wide area, metropolitan area and local area network services, point-to-point communications technologies, general packet radio technologies or other suitable technologies or any combination of the thereof.

The signal processor 56 implements any of the known signal processing algorithms to process the received signals, including selecting one received signal from among the received signals produced by the radiators 1 to N or combining a plurality of the received signals. The signals can be combined according to weighting elements, including phase shifting, amplitude weighting and/or complex weighting.

Figure 5:
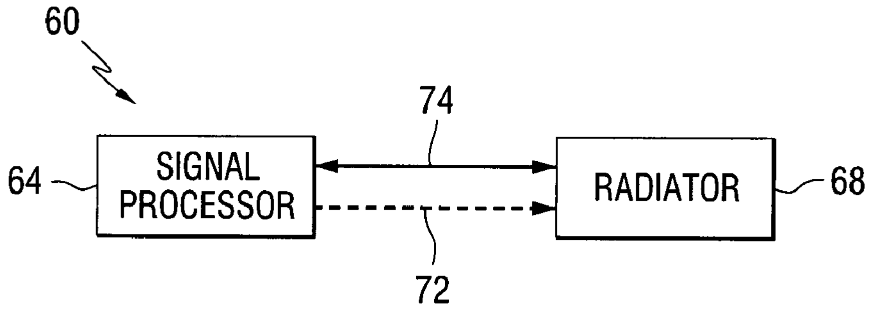

FIG. 5 illustrates another embodiment of a communications device 60 comprising a signal processor 64 and radiator 68. One or more control signals produced by control elements of the signal processor 64 and supplied to the radiator 68 over a control conductor 72 control structural elements of the radiator 68 to effect a change in the physical attributes and/or geometrical configuration of the radiator elements to maximize or minimize a signal quality metric, e.g., capacity, bit error rate, signal to interference ratio, data rate, packet rate, noise variance, noise mean square error, as a function of time. Essentially, the control signals control the structural elements to enhance the received signal or to limit the received interference or noise. In the receiving mode, the received signal is supplied by the radiator 68 to the signal processor 64 on a conductor 74. In the transmit mode, the signal to be transmitted is supplied to the radiator 68 over the conductor 74.

The radiator 68 is controlled as a function of time to change its structural or operational features to produce multiple signals during the control interval, i.e., during time increments.

Figure 6:
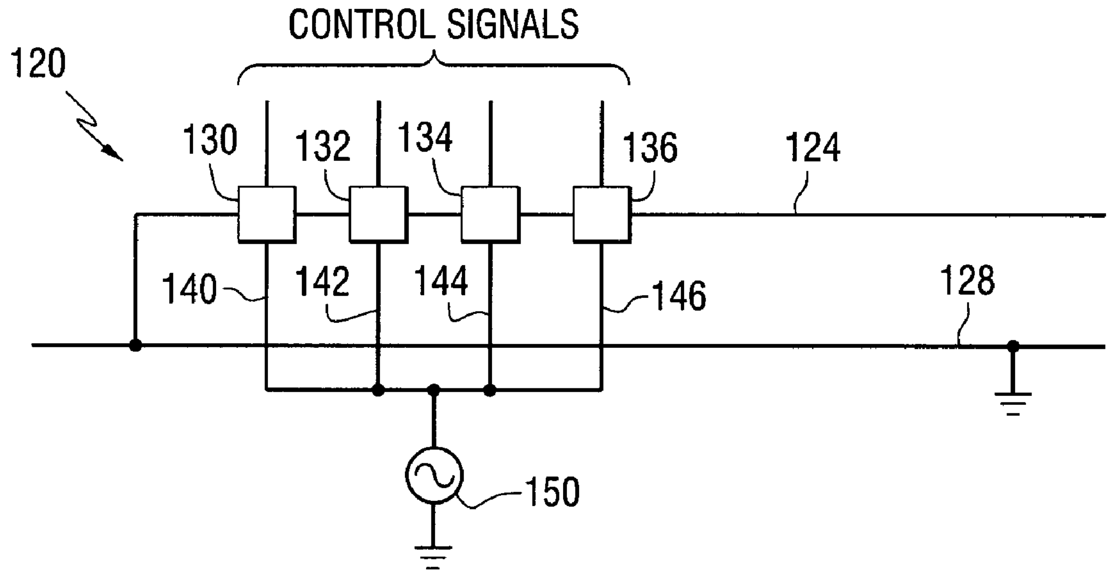
FIGS. 6-13 illustrate radiators and antenna structures for use in the communications devices of FIGS. 4 and 5 according to the present invention.

FIG. 6 illustrates an exemplary radiator 120 (suitable for use as one or more of the radiators 1 to N of FIG. 4 or as the radiator 68 of FIG. 5) implementing a controllable feed and/or ground connection for altering the performance characteristics of the radiator 120. The radiator 120 comprises a conductive element 124 disposed over a ground plane 128. Switching elements 130, 132, 134 and 136 each controllably connect feed conductors 140, 142, 144 and 146 to a respective region of the conductive element 124, such that a signal source 150 is connected to the region through the closed switching element 130, 132, 134 or 136. The switching elements 130, 132, 134 and 136 are configured to an opened or a closed state in response to the control signals described above. Sequential opening and closing of the switching elements can be used to further control operating characteristics of the radiator 120.

Figure 7:
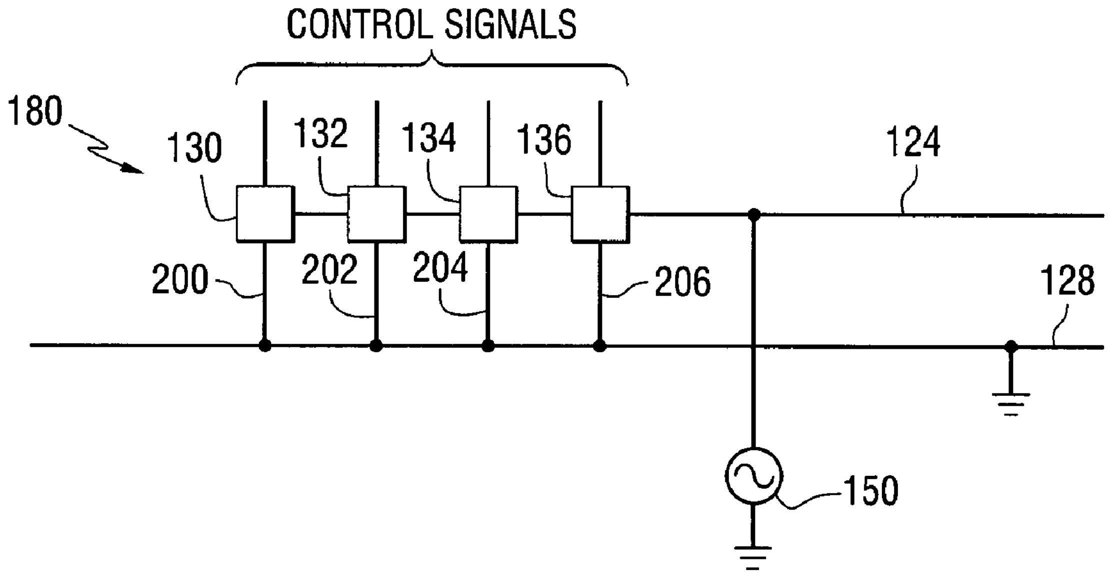

In another embodiment, a radiator's shunt connection to ground is repositioned by operation of one or more of a plurality of switching elements each connecting a different region of the radiator to ground through a different conductive element. FIG. 7 illustrates an antenna 180 and switching elements 190, 192, 194 and 196 for switchably connecting conductive elements 200, 202, 204 and 206, each extending from a different region on the conductive element 124, to ground.

Although the FIG. 6 embodiment describes features of the present invention (e.g., controllable feed and ground point) as applied to a PIFA antenna (planar-inverted F antenna), the teachings can be applied to other antenna types, including monopole and dipole antennas, patch antennas, helical antennas, meanderline loaded antennas and dielectric resonant antennas. Application of the controllable feed and/or ground connection features, to multiple radiators 1 to N of the extended smart antenna system 48, increases the signal distance between the received signals thereby increasing the signal processing gain of the communications device.

The switching elements identified in FIGS. 6 and 7 can be implemented by discrete switches (e.g., PIN diodes, control field effect transistors, micro-electro-mechanical systems, or other switching technologies known in the art) to move the feed tap (feed terminal) point or the ground tap (ground terminal) point in the radiator structure, changing the impedance appearing between the feed and ground terminals, i.e., the impedance seen by the power amplifier feeding the radiator. The switching elements can also comprise organic laminate carriers attached to the antenna to form a module comprising the antenna and a substrate on which the radiator and its associated components are mounted.

Repositioning the feed and/or the ground location on an antenna structure can also alter the radiation pattern. Appropriate selection of the feed/ground point for one or more of the radiators 1 to N increases the signal distance between the received signals supplied by the radiators 1 to N, correspondingly increasing the signal processing gain.

Figure 8:
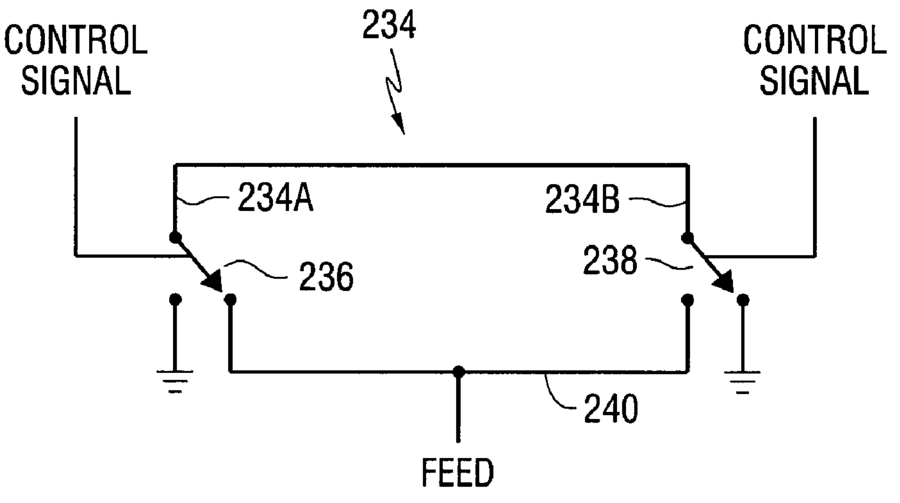

FIG. 8 illustrates a radiator 234 having a controllable configuration that can be altered according to a control signal for use with the extended smart antenna system 48 of the present invention. The radiator 234 can be fed at either end 234A or 234B by suitable control of respective switching elements 236 and 238. In a first configuration, the switch 236 is operated responsive to the control signals to connect the end 234A to a feed 240 and the switch 238 is operated responsive to the control signals to connect the end 234B to ground. In a second configuration the switch 236 is operated to connect the end 234A to ground and the switch 238 is operated to connect the end 234B to the feed 240. The first and second configurations switch the apparent center of the radiator 230 between the end 234A and 234B, providing spatial diversity for the radiator 230.

Figure 9:
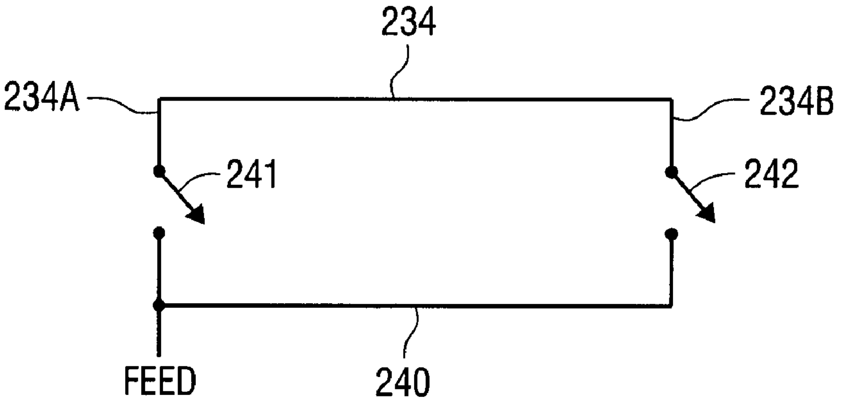

In an embodiment of FIG. 9, the radiator 234 is configurable according to single position switching elements 241 and 242 located as illustrated at ends 234A and 234B to feed the radiator 234 at either end 234A or 234B, with the opposite end in an open state.

Figure 10:
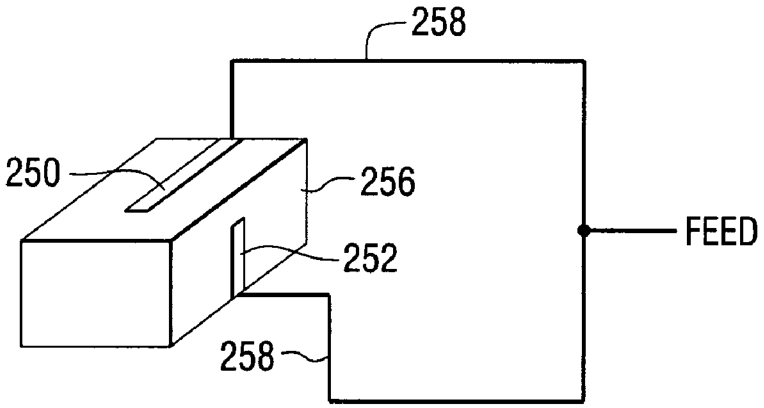

In an embodiment of FIG. 10, two radiators 250 and 252 disposed on an outside surface of a dielectric substrate 256 provide polarization diversity when simultaneously fed from a feed 258. Appropriate combining (without or without amplitude/phase weighting) of the received signals increases the signal distance between the received signals, and when operative with the signal processor 56 of FIG. 4, the processing gain of the communications device.

Figure 4:
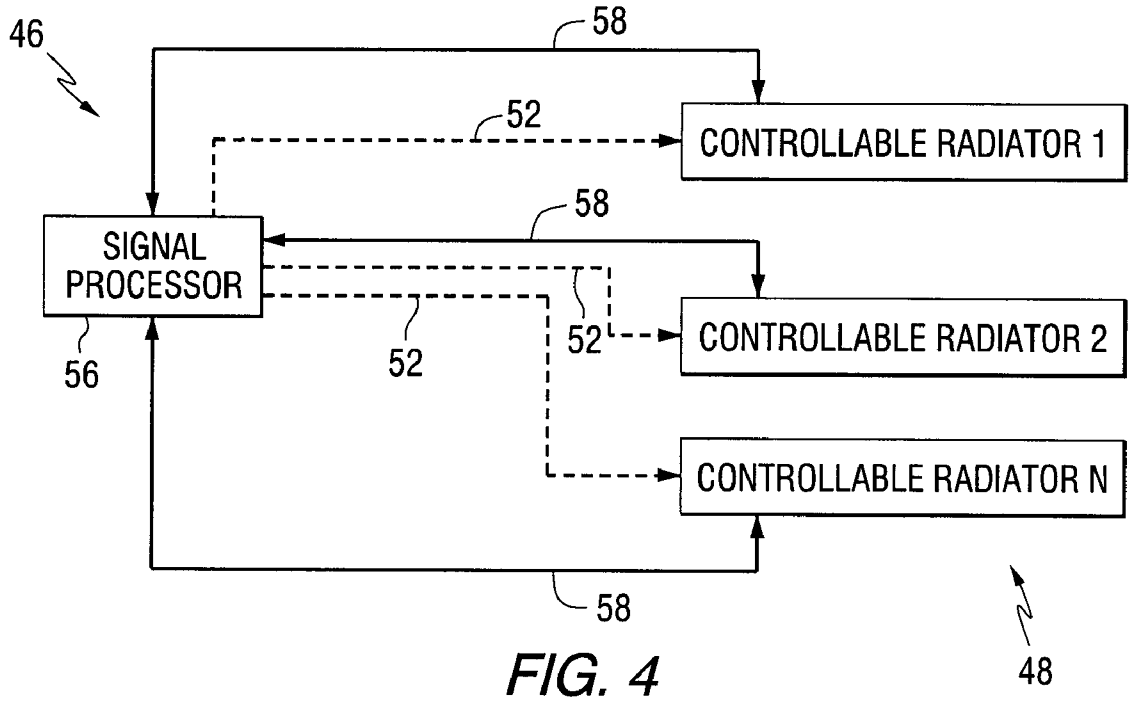
FIGS. 4 and 5 illustrate communications devices incorporating the teachings of the present invention.
Figure 11:
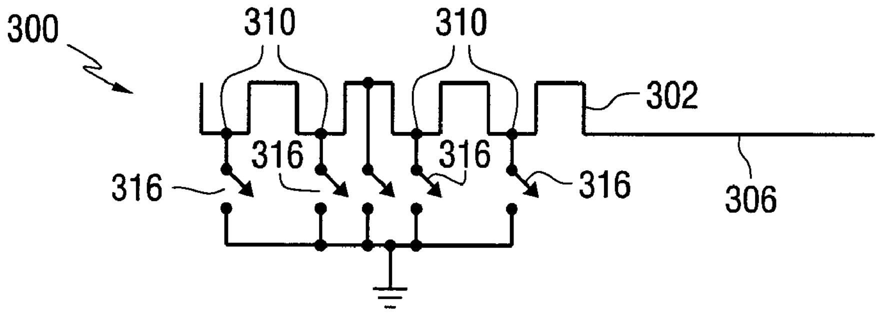

FIG. 11 illustrates yet another configurable radiator structure for use as an element of the extended smart antenna system 48 of FIG. 4 or the radiator 68 of FIG. 5. A radiator 300, which can serve as one or more of the radiators 1 to N, comprises a meanderline element 302 connected to a radiating element 306. Exemplary taps 310 on the meanderline element 302 are connected to ground by closing an associated switch 316. In addition to affecting other antenna parameters, ground point control provides bandwidth control, resulting in increased signal distance if two or more of the radiators 300 are employed in the extended antenna system 48 of FIG. 4.

Figure 12:
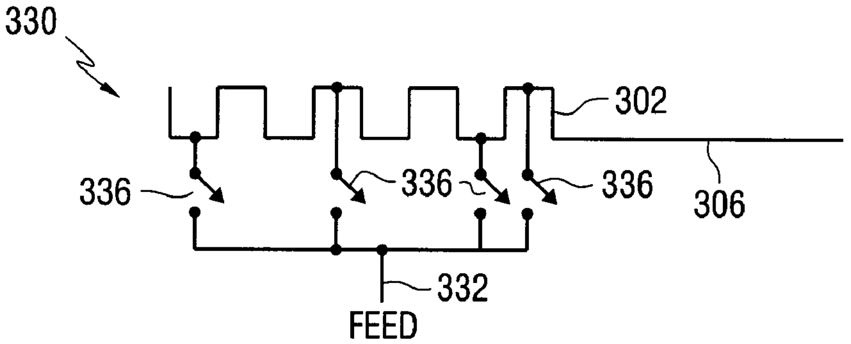

In a FIG. 12 embodiment, a radiator 330 comprises a configurable signal feed 332 as determined by closing one of the switches 336. Closing one or more of the switches 336 changes at least the resonant frequency and the antenna impedance, and to a lesser extent, the radiation pattern of the radiator 330.

In addition to an embodiment wherein each controllable radiator 1 to N in FIG. 4 or the radiator 68 of FIG. 5 is configured and remains in that configuration during an operating interval, one or more of the radiators (or in the case of the radiator 68, one or more of the elements of the radiator 68) can be adaptively reconfigured during the operating interval to improve the processing gain. Further, all radiators 1 to N (or a subset of the radiators 1 to N) can be simultaneously reconfigured or each can be reconfigured at spaced apart times to introduce a time phase component into the operation of the extended smart antenna system 48 of the present invention. The order in which the radiators 1 to N (or the structural elements of the radiator 68) are configured can also be varied. In one embodiment alternating radiators are reconfigured during a first time interval and adjacent radiators reconfigured during a second time interval. The time-based sequencing of antenna characteristics (e.g., signal polarization, gain, pattern diversity) increases the signal distance and thus improves the processing gain.

Figure 13:
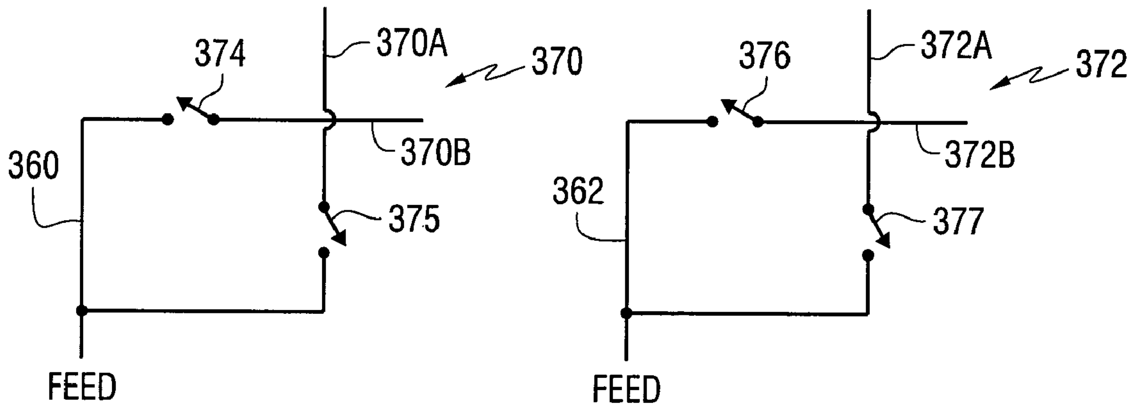

In an example of this embodiment illustrated in FIG. 13, switched feeds 360 and 362 for respective radiators 370 (comprising radiating elements 370A and 370B) and 372 (comprising radiating elements 372A and 372B) (the radiators 370 and 372 being two radiators of the radiators 1 to N) are controlled to time sequence the radiators through different signal polarizations by operation of the switches 374, 375, 376 and 377. When used in the receive mode the techniques of the present invention may require less signal processing horsepower and in the transmit mode may permit a lower power output from the power amplifier, i.e., the signal processing gain of the communications device is increased.

FIG. 14 diagrammatically illustrates a state diagram for controllable polarization and pattern states (i.e., polarization and pattern diversity) for one controllable radiator 1 to N. The vertical axis indicates that the radiator is controllable to achieve either a first pattern (e.g. a pattern directing most of the energy toward a zenith) and a second pattern (e.g., a pattern directing most of the energy in a given azimuth direction). The horizontal axis indicates that the achievable antenna polarization includes either vertical or horizontal polarization for a monopole or dipole antenna, and left hand circular or right hand circular polarization for an antenna transmitting/receiving a circularly polarized signal. Thus four different polarization/pattern combinations are possible in the illustrated example.

In one embodiment, one of the four possible pattern and polarization combinations is selected and the radiator operated in that configuration during a first operating epoch. A different pattern/polarization combination is selected for another controllable radiator of the radiators 1 to N to increase the signal distance between the received signal at the two radiators. During a second operating epoch each radiator is configured to a different one of the four possible combinations.

This embodiment is illustrated in FIG. 15 where three radiators and their polarization/pattern combination during epochs 1 and 2 are set forth. During different time epochs each of three radiators N−1, N and N+1 ate controlled to produce different polarization and pattern characteristics. As those skilled in the art recognize, a nearly infinite number of sequences and combinations are possible. The number of sequence combinations is a function of the number N and increases as N increases.

In another embodiment one of the radiators 1 to N is controlled to operate cyclically through a sequence of pattern/polarization combinations while another radiator operates though a different sequence, as controlled by control signals supplied to the radiators as described above. Arrowheads 400 and 402 illustrate two exemplary sequences for traversing the four possible polarization/pattern combinations. Other sequences are clearly possible, as well as other antenna attributes besides polarization and pattern. In the extended smart antenna system 48 of the present invention each radiator 1 to N can be assigned a unique sequence pattern or all radiators can be controlled according to the same pattern with a phase difference (including a zero phase difference) between the pattern sequences. Additionally, the pattern/polarization characteristics described above can be synchronously implemented among the radiators (especially between adjacent radiators) to create larger instantaneous or continuous "signal distances" between the received signals.

The references to signal polarization and pattern in FIG. 14 are merely exemplary characteristics, as other embodiments can utilize other antenna characteristics that influence the received signal and thus the signal processing gain achievable when the received signals are combined.

The antenna patterns and signal polarization characteristics, or other antenna performance characteristics, can be selected to optimize the antenna signal processing gain for a specific channel characteristic or a specific signal protocol. For example, the antenna characteristics and time sequencing as illustrated in FIGS. 14 and 15 may be different for a CDMA signal with substantial multi-path signals (for example, when received in a building) than for a GSM signal received by a communications device operating in free space. Determination of the appropriate time sequencing is responsive to a real-time determination of the operating environment of the communications device and/or determination of one or more signal quality metrics (e.g., signal strength, carrier to noise ratio).

For operation in higher frequency bands (relative to the space available for antennas within the communications device), the antenna is fed to produce a diverse radiation pattern. The technique may be used in addition to, or in combination with, the techniques described above to create additional antenna-based "signal distances" between signals (i.e., decorrelate) produced by the radiators and provided to die signal processor 56 or the signal processor 64.

In addition to performing the signal processing functions, in a preferred embodiment the signal processor 56/64 controls the switching, time sequencing, or other control functions described or suggested herein. In one embodiment the control signals are derived from other elements in the communications device, such as a base band processor that provides a signal representing the bit error rate, frame error rate, data rate, etc. The control signals can also be determined responsive to one or more predetermined signal quality metrics, the operating frequency, the signal protocol, etc.

FIG. 16 illustrates an exemplary extended smart antenna system 450 comprising four antenna elements 450A, 450B, 450C and 450D, each permitting the antenna to radiate in one of four directions responsive to one of four states of a switch 454. The signal processor 56 randomly selects one of four possible states for the switch 454. If the signal processor 56 determines that no signal is present for the selected state, the processor 56 controls the switch 454 to another state. The state switching continues until a signal is detected and a signal quality metric is determined for the current switch state. Another switch configuration is selected, and the metric computed and compared to the metric for the previous switch configuration. If an improvement is indicated, the new switch configuration is retained; otherwise another switch configuration is selected, either immediately or after reverting to the previous state. A new metric value is computed and compared to the previous metric; the configuration yielding the best metric is selected for operation of the antenna system 450. Additional states may be added for comparison based on a variety of search algorithms known in the art. The extended smart antenna system 450 may be suitably controlled to produce the sequences and characteristic combinations set forth in FIGS. 14 and 15.

The creation and use of additional "information elements" by controlling the radiators 1 to N of FIG. 4 or the radiator 68 of FIG. 5 to present desired physical attributes and/or geometrical configurations may advantageously reduces the number of radiating elements required for a desired level of processing gain from the number of radiators in prior art antenna systems. This in turn reduces the volume occupied by the antennas, permitting an antenna volume reduction so that smaller hand-held devices can be produced. Alternatively, if the number of radiating elements is maintained at or near the level of the prior art devices, additional signal processing gain can be realized according to the teachings of the present invention. By adding more radiators or modifying the reconfiguration process of the radiators, it may be possible to reduce the processing requirements of the signal processor, thus reducing the complexity, power requirements and/or cost of that component. For example, if a desired level of processing gain is achieved according to the prior art communications devices by using a definitive number of radiators, it may be possible to reduce that number while maintaining the desired processing gain and additionally permit a physically smaller communications handset device.

Although most of the features of the present invention are described with reference to a received signal, those skilled in the art recognize that the same concepts of signal distance and antenna element control are applicable to the extended smart antenna system operating in the transmitting mode. Further, the antenna control methodologies of the present inventions may advantageously differ for receiving and transmitting mode operation.

Although the present invention has been described with reference to preferred embodiments, it will be understood by those skilled in the art that various changes may be made and equivalent elements may be substituted for the elements thereof without departing from the scope of the invention. The scope of the present invention further includes any combination of elements from the various embodiments set forth herein. In addition, modifications may be made to adapt a particular situation to the teachings of the present invention without departing from its essential scope. Therefore, it is intended that the invention not be limited to the particular embodiments disclosed, but that the invention will include all embodiments falling within the scope of the appended claims.

What is claimed is:

1. A communications device for receiving a propagating electromagnetic signal representing an information signal, the communications device comprising:

a plurality of radiators, each radiator comprising structural elements;

a controller for configuring one or more of the structural elements of each one of the plurality of radiators to produce corresponding operating characteristics for each one of the plurality of radiators;

each one of the plurality of radiators producing a received signal, signal characteristics of each received signal determined by the operating characteristics of the associated one of the plurality of radiators;

the controller for determining a signal distance between pairs of the received signals and for further configuring one or more of the structural elements of one or more of the plurality of radiators to further increase the signal distance or decrease a correlation between pairs of the received signals; and a signal processor responsive to at least one of the received signals for determining the information signal.

2. The communications device of claim 1 wherein the information signal comprises an analog signal or a digital signal representing data, video, voice, audio, and multimedia information.

3. The communications device of claim 1 the controller for further determining a signal quality metric of one or more of received signals, wherein the controller continues to determine the signal distance and reconfigure the structural elements until a desired signal quality metric is determined.

4. The communications device of claim 1 wherein the operating characteristics comprise at least one of radiation pattern, antenna impedance, antenna resonant frequency, signal polarization, antenna gain, radiation intensity, pattern directivity, bandwidth and antenna efficiency.

5. The communications device of claim 1 wherein the signal processor is responsive to a combination of two or more received signals for determining the information signal.

6. The communications device of claim 5 wherein the combination of the two or more received signals comprises one or more of an average, a sum or a weighted sum, and wherein the weighted sum comprises amplitude weighting, phase weighting or a combination of amplitude and phase weighting.

7. The communications device of claim 1 wherein the controller reconfigures one or more of the structural elements of each one of the plurality of radiators with time.

8. The system of claim 1 wherein the structural elements comprise a feed point, a ground point, an orientation, a separation distance and an effective electrical length.

9. The system of claim 1 wherein the plurality of radiators further comprise one or more switching elements responsive to the controller for configuring the one or more structural elements of the plurality of radiators.

10. The system of claim 1 wherein the operating characteristics comprise different time-based signal polarizations and radiation patterns.

11. An antenna for receiving a propagating electromagnetic signal representing an information signal, the antenna operative with an antenna controller and a signal processor, the antenna comprising:

a plurality of radiators, wherein each radiator comprises a plurality of structural elements, each radiator further comprising a resonant element responsive to the electromagnetic signal for producing a received signal;

the antenna controller for configuring one or more of the structural elements of a first radiator to produce corresponding operating characteristics for the first radiator, the first radiator for producing a first received signal at a first resonant element, characteristics of the first received signal determined by the operating characteristics of the first radiator;

the antenna controller for configuring one or more of the structural elements of a second radiator to produce corresponding operating characteristics for the second radiator, the second radiator for producing a second received signal at a second resonant element, characteristics of the second received signal determined by the operating characteristics of the second radiator, the second operating characteristics different from the first operating characteristics and the second received signal different from the first received signal;

the antenna controller for determining a signal distance between the first and the second received signals, and for further configuring one or both of the structural elements of the first and the second radiators to further increase a signal distance or decrease a correlation between the first and the second received signals; and the signal processor for processing the first and the second received signals to determine the information signal.

12. The antenna of claim 11 wherein the first and the second operating characteristics comprise one or more of radiation pattern, antenna impedance, antenna resonant frequency, signal polarization, antenna gain, radiation intensity, pattern directivity, bandwidth and antenna efficiency.

13. The antenna of claim 11 wherein the information signal comprises an analog signal or a digital signal representing data, video, voice, audio, and multimedia information.

14. The antenna of claim 11 further comprising a control signal produced by the antenna controller responsive to a signal quality metric of at least one of the first and the second received signals.

15. The antenna of claim 11 wherein the signal processor is responsive to a combination of the first and the second received signals for determining the information signal.

16. The antenna of claim 11 wherein the structural elements of the first radiator and the structural elements of the second radiator comprise a feed point, a ground point, an orientation, a separation distance and an effective electrical length.

17. The antenna of claim 11 wherein the first and the second radiators further comprise one or more switching elements responsive to the antenna controller for configuring the one or more structural elements of the first and the second radiators.

18. The antenna of claim 11 wherein the first received signal and the second received signal comprise different time-based signal polarizations and radiation patterns.

19. An antenna operative with a feed and a ground, the antenna having first and second terminal ends, comprising:

a first switching element at the first terminal end having a first condition according to which the first terminal end is connected to the feed and a second condition according to which the first terminal end is connected to the ground;

a second switching element at the second terminal end having a first condition according to which the second terminal end is connected to the feed and a second condition according to which the second terminal is connected to the ground; and wherein in a first operating mode the first switching element is controlled to the first condition and the second switching element is controlled to the second condition and in a second operating mode the first switching element is controlled to the second condition and the second switching element is controlled to the first condition.

20. An antenna operative with a feed, the antenna having first and second terminal ends, comprising:

a first switching element at the first terminal end having a first condition according to which the first terminal end is connected to the feed and a second condition according to which the first terminal end open;

a second switching element at the second terminal end having a first condition according to which the second terminal end is connected to the feed and a second condition according to which the second terminal is open; and wherein in a first operating mode the first switching element is controlled to the first condition and the second switching element is controlled to the second condition and in a second operating mode the first switching element is controlled to the second condition and the second switching element is controlled to the first condition.

21. An antenna for receiving a propagating electromagnetic signal representing an information signal, the antenna operative with an antenna controller and a signal processor, the antenna comprising:

a plurality of structural elements including a resonant element responsive to the electromagnetic signal for producing a received signal;

the antenna controller for controlling one or more of the structural elements as a function of time to produce received signals that differ as a function of time; and the signal processor for processing the received signals to determine the information signal.

22. A signal processor operative with a plurality of antennas in a communications device, each antenna comprising a plurality of structural elements, the signal processor comprising;

a controller for configuring one or more of the structural elements of each one of the plurality of antennas to effect operating characteristics of each antenna;

each one of the plurality of antennas producing a received signal, signal characteristics of each received signal determined by operating characteristics of the associated one of the plurality of antennas;

the controller for determining a signal distance between pairs of the received signals, and further configuring one or more of the structural elements of one or more of the plurality of radiators to further increase the signal distance or decrease a correlation between pairs of the received signals; and processing elements responsive to at least one of the received signals for determining the information signal.

23. The signal processor of claim 22 further comprising a combining element for combining the two or more received signals to produce a combined signal, the processing elements responsive to the combined signal for determining the information signal.

* * * * *